US010690270B2

(12) United States Patent
Fleischer et al.

(10) Patent No.: US 10,690,270 B2
(45) Date of Patent: Jun. 23, 2020

(54) ADDITIVE MANUFACTURING OF PIPES

(71) Applicant: Lockheed Martin Corporation, Bethesda, MD (US)

(72) Inventors: Corey A. Fleischer, Abingdon, MD (US); Matthew B. Ascari, Manassas, VA (US); Randy L. Gaigler, Parkville, MD (US); Michael W. Poppek, Westminster, MD (US); James A. Waicukauski, Bel Air, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 16/233,877

(22) Filed: Dec. 27, 2018

(65) Prior Publication Data

US 2019/0128448 A1 May 2, 2019

Related U.S. Application Data

(62) Division of application No. 14/932,186, filed on Nov. 4, 2015, now Pat. No. 10,197,196.
(Continued)

(51) Int. Cl.
*B29C 64/106* (2017.01)
*F16L 9/127* (2006.01)
(Continued)

(52) U.S. Cl.
CPC ............ *F16L 9/127* (2013.01); *B29C 64/106* (2017.08); *B29C 64/209* (2017.08);
(Continued)

(58) Field of Classification Search
CPC ....... B29C 64/00; B29C 64/106; B29C 64/20; B29C 64/209; B29C 64/232;
(Continued)

(56) References Cited

U.S. PATENT DOCUMENTS 3,740,958 A * 6/1973 Cadwell .................... F16L 1/18
405/166
4,157,194 A 6/1979 Takahashi
(Continued)

FOREIGN PATENT DOCUMENTS

TW 200622140 A 7/2006
TW 200743724 A 12/2007
(Continued)

OTHER PUBLICATIONS

First Office Action for Chinese Patent Application No. 201580060279.5, dated Sep. 25, 2018, 8 pages.
(Continued)

*Primary Examiner* — Xiao S Zhao
*Assistant Examiner* — Joseph S Leyson
(74) *Attorney, Agent, or Firm* — Withrow & Terranova, PLLC

(57) ABSTRACT

Additive manufacturing of a pipe is disclosed. A lowering mechanism is configured to be coupled with respect to a platform and to lower a pipe through an opening in the platform. An extrusion head is configured to receive material and selectively extrude the material via a nozzle. A gantry is coupled to the extrusion head and is configured to move the extrusion head to an identified location. A controller is coupled to the gantry and configured to direct the gantry to move the extrusion head based on pipe data that identifies a geometry of the pipe. A stabilizer mechanism is configured to maintain the pipe in a desired position during the extrusion of the material.

10 Claims, 8 Drawing Sheets

Related U.S. Application Data

(60) Provisional application No. 62/079,187, filed on Nov. 13, 2014.

(51) Int. Cl.

| | | |
|---|---|---|
| *B29C 64/232* | (2017.01) | |
| *B29C 64/209* | (2017.01) | |
| *B29C 64/25* | (2017.01) | |
| *B29C 64/236* | (2017.01) | |
| *B29C 64/379* | (2017.01) | |
| *B29C 64/393* | (2017.01) | |
| *F16L 1/15* | (2006.01) | |
| *F16L 1/20* | (2006.01) | |
| B29C 64/386 | (2017.01) | |
| B33Y 10/00 | (2015.01) | |
| B33Y 30/00 | (2015.01) | |
| B33Y 50/02 | (2015.01) | |
| B33Y 80/00 | (2015.01) | |
| B29K 23/00 | (2006.01) | |
| B29L 23/00 | (2006.01) | |

(52) U.S. Cl.
CPC .......... *B29C 64/232* (2017.08); *B29C 64/236* (2017.08); *B29C 64/25* (2017.08); *B29C 64/379* (2017.08); *B29C 64/393* (2017.08); *F16L 1/15* (2013.01); *F16L 1/206* (2013.01); B29C 64/386 (2017.08); B29K 2023/065 (2013.01); B29L 2023/22 (2013.01); B33Y 10/00 (2014.12); B33Y 30/00 (2014.12); B33Y 50/02 (2014.12); B33Y 80/00 (2014.12); Y02E 10/34 (2013.01)

(58) Field of Classification Search
CPC ..... B29C 64/236; B29C 64/25; B29C 64/379; B29C 64/386; B29C 64/393; B33Y 10/00; B33Y 30/00; B33Y 80/00
See application file for complete search history.

(56) References Cited

U.S. PATENT DOCUMENTS

| | | |
|---|---|---|
| 4,497,342 A | 2/1985 | Wenzel et al. |
| 5,303,141 A | 4/1994 | Batchelder et al. |
| 5,402,351 A | 3/1995 | Batchelder et al. |
| 8,568,121 B2 | 10/2013 | Khoshnevis |
| 9,562,632 B1 | 2/2017 | Billman et al. |
| 2009/0178722 A1 | 7/2009 | Howard |
| 2009/0309248 A1 | 12/2009 | Miller et al. |
| 2009/0309271 A1 | 12/2009 | Miller et al. |
| 2013/0011199 A1 | 1/2013 | Kibbee et al. |
| 2013/0042613 A1 | 2/2013 | Ross et al. |
| 2013/0333798 A1 | 12/2013 | Bosveld et al. |
| 2014/0048980 A1 | 2/2014 | Crump et al. |
| 2016/0138736 A1 | 5/2016 | Fleischer et al. |

FOREIGN PATENT DOCUMENTS

| | | |
|---|---|---|
| WO | 2014062710 A1 | 4/2014 |
| WO | 2014112865 A1 | 7/2014 |

OTHER PUBLICATIONS

Non-Final Office Action for U.S. Appl. No. 14/932,186, dated Nov. 17, 2017, 10 pages.
Final Office Action for U.S. Appl. No. 14/932,186, dated Jun. 15, 2018, 11 pages.
Notice of Allowance for U.S. Appl. No. 14/932,186, dated Sep. 20, 2018, 8 pages.
Extended European Search Report for European Patent Application No. 15858854.1, dated Aug. 16, 2018, 5 pages.
International Search Report and Written Opinion for International Patent Application No. PCT/US2015/059009, dated Jan. 8, 2016, 14 pages.
International Preliminary Report on Patentability for International Patent Application No. PCT/US2015/059009, dated May 26, 2017, 11 pages.
Extended European Search Report for European Patent Application No. 19159625.3, dated Aug. 20, 2019, 5 pages.
Office Action for Taiwanese Patent Application No. 104137074, dated Jul. 11, 2019, 7 pages.
Notice of Reasons for Refusal for Japanese Patent Application No. 2017-525920, dated Nov. 5, 2019, 9 pages.

\* cited by examiner

ADDITIVE MANUFACTURING OF PIPES

RELATED APPLICATIONS

This application is a divisional of utility patent application Ser. No. 14/932,186, filed on Nov. 4, 2015, entitled "ADDITIVE MANUFACTURING OF PIPES", which claims the benefit of provisional patent application Ser. No. 62/079,187, filed on Nov. 13, 2014, entitled "ADDITIVE MANUFACTURING OF PIPES," the disclosures of which are hereby incorporated herein by reference in their entirety.

TECHNICAL FIELD

The embodiments relate generally to pipe manufacturing, and in particular to additive manufacturing of pipes.

BACKGROUND

There is increasing interest in Ocean Thermal Energy Conversion (OTEC) as a renewable source of electrical energy. OTEC uses the ocean's natural thermal gradient to generate power. In geographical areas with warm surface water and cold deep water, the temperature difference can be leveraged to drive a steam cycle that turns a turbine and produces power. Warm surface sea water passes through a heat exchanger, vaporizing a low boiling point working fluid to drive a turbine generator, thereby producing electricity. Unfortunately, one challenge with OTEC is the need for a cold water pipe (CWP) that must be capable of drawing large volumes of water from deep in the ocean up to the surface.

A CWP used in OTEC is very long and has a large diameter. For example, a CWP may be 4 meters (m) in diameter and more than 1000 m in length. Conventional CWPs are built in situ by coupling smaller segments of pipe together to form a CWP of a desired length, or by molding the segments of pipe at a deep water location and assembling them as they are molded. There are many problems with conventional CWP building techniques, including the amount of time it takes to build such a pipe and the amount of space it takes to mold the segments of pipe. These problems alone can make OTEC impractical for many otherwise suitable applications. Accordingly, a CWP manufacturing technique that avoids these issues would be beneficial.

SUMMARY

The embodiments relate to mechanisms for generating a pipe that utilizes additive manufacturing. The embodiments facilitate in-situ vertical generation of a relatively long pipe having a relatively large diameter. In some embodiments, the pipe may have an interior diameter in excess of 4 meters (m) and have a length greater than 1000 m. Among other features, the embodiments greatly reduce the time necessary to put into place a cold water pipe (CWP) in an Ocean Thermal Energy Conversion (OTEC) system.

In one embodiment, a system is provided. The system includes a lowering mechanism that is configured to be coupled with respect to a platform and to lower a pipe assembly through an opening in the platform. The system also includes an extrusion head that is configured to receive material and to selectively extrude the material via a nozzle. A gantry is coupled to the extrusion head and is configured to move the extrusion head to an identified location. A controller is coupled to the gantry and configured to control the gantry to move the extrusion head based on pipe data that identifies a geometry of the pipe assembly. A stabilizer mechanism is configured to maintain the pipe assembly in a desired position.

In one embodiment, the lowering mechanism comprises a plurality of winches comprising corresponding cables, wherein each cable is configured to be coupled to the pipe assembly. In one embodiment, the pipe assembly may include a ring of material, such as a clump weight, on which a pipe wall is generated.

In one embodiment, the material comprises high-density polyethylene.

In one embodiment, the controller is configured to direct the extrusion head to generate a pipe wall of the pipe assembly as a cellular structure. The cellular structure is characterizable in terms of a void-to-material ratio. In one embodiment, the void-to-material ratio varies along a longitudinal length of the pipe wall.

In one embodiment, the controller is coupled to the lowering mechanism and is further configured to selectively signal the lowering mechanism to enter a halt mode or to enter a lowering mode. In one embodiment, the controller is further configured to signal the gantry to move the extrusion head about an end of the pipe assembly, signal the extrusion head to extrude a layer of material onto a top edge of the end of the pipe assembly, and after the layer of material is extruded onto the top edge of the end of the pipe assembly, signal the lowering mechanism to enter the lowering mode to lower the pipe assembly a predetermined distance.

In another embodiment, a method for generating a pipe assembly is provided. A ring of material is positioned with respect to an extrusion head. The ring of material is coupled to a lowering mechanism. Material is extruded on top of the ring of material to form a pipe wall on the ring of material. Iteratively, the ring of material and the pipe wall are lowered a predetermined distance, and the material is extruded on the pipe wall to extend the pipe wall until the pipe wall is a desired length.

In one embodiment, the platform forms an opening, and the ring of material and the pipe wall are lowered through the opening in the platform. In one embodiment, the platform is in a body of water, such as an ocean, and the ring of material and the pipe wall are lowered through the opening in the platform into the body of water.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The term "about" used herein in conjunction with a numeric value means any value that is within a range of ten percent greater than or ten percent less than the numeric value.

The embodiments relate to a pipe assembly system that utilizes additive manufacturing. The embodiments facilitate in-situ generation of a relatively long pipe having a relatively large diameter. In some embodiments, the pipe may have an interior diameter in excess of 4 meters (m) and have a length greater than 1000 m. Among other features, the embodiments greatly reduce the time necessary to put into place a cold water pipe (CWP) in an Ocean Thermal Energy Conversion (OTEC) system. The embodiments also substantially reduce the size of the structure necessary to assemble a CWP.

Figure 1:
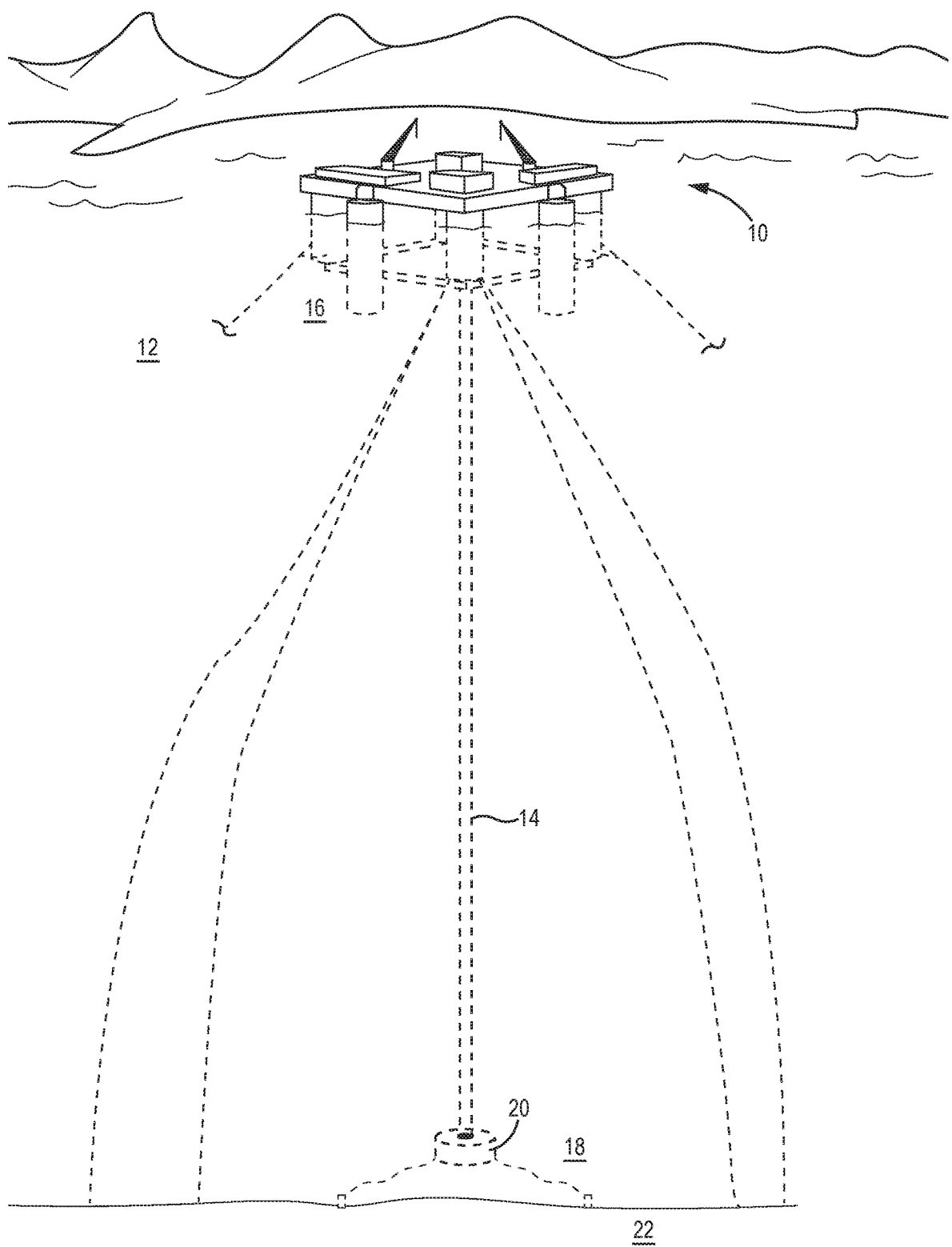
FIG. 1 is an illustration of an Ocean Thermal Energy Conversion (OTEC) system in an ocean.

FIG. 1 is an illustration of an OTEC system 10 in an ocean 12. Certain elements of a conventional OTEC system have been omitted. The OTEC system 10 includes a CWP assembly 14 that extends from a surface region 16 of the ocean 12 to a deep water region 18 of the ocean 12. The CWP assembly 14 may include a weight, such as a clump weight 20, that helps stabilize the CWP assembly 14 during operation. In some installations, the CWP assembly 14 may be anchored to an ocean floor 22.

In some embodiments, the CWP assembly 14 may have a longitudinal length of 1000 meters or more and may have a diameter of more than 12 feet. Conventional mechanisms for implementing the CWP assembly 14 include coupling many smaller segments of pipe together at the location of the OTEC system 10, or molding the multiple segments of pipe at the location of the OTEC system 10 and assembling them as they are molded. There are many problems with such conventional manufacturing techniques, including the amount of time it takes to manufacture the CWP assembly 14 and the amount of space required. Once the CWP assembly 14 is completed and implemented, the majority of the CWP assembly 14 is underwater and is thus relatively protected from extreme weather, such as hurricanes, cyclones, and the like. However, during assembly of the CWP assembly 14, the CWP assembly 14 may be relatively easily damaged in the event of extreme weather. Thus, the longer it takes to manufacture the CWP assembly 14, the higher the likelihood of severe weather damaging the partially assembled CWP assembly 14.

Figure 2:
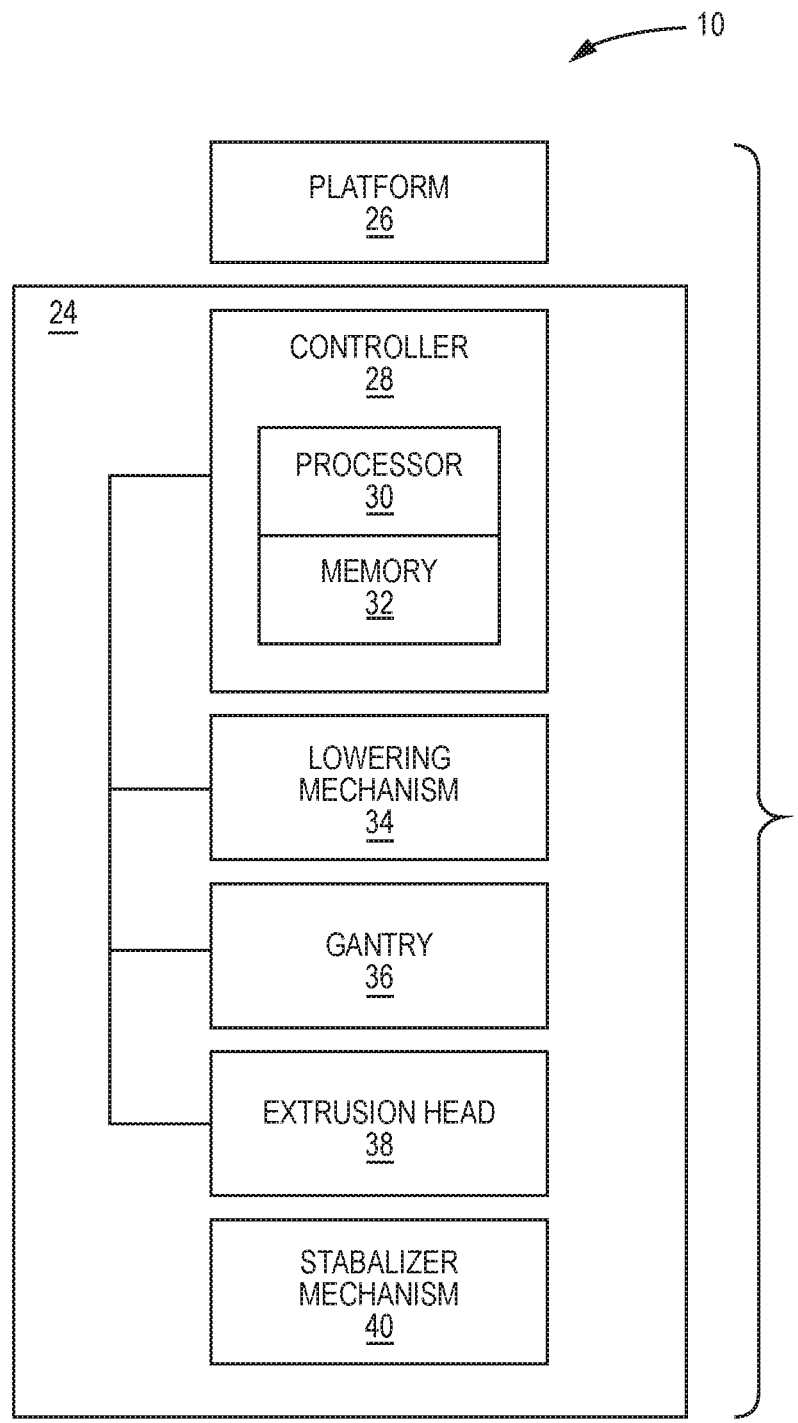
FIG. 2 is a block diagram of a system for generating a pipe assembly according to one embodiment.

FIG. 2 is a block diagram of a system 24 for generating a pipe assembly according to one embodiment. The system 24 is implemented on an OTEC platform 26 that forms an opening through which a CWP assembly can be lowered into a body of water, such as an ocean, as the CWP assembly is manufactured. The OTEC platform 26 may comprise, for example, a deep water platform that is anchored in a deep water location of the ocean, such as a location that is in excess of 1000 m deep. A controller 28 includes a processor 30 and a memory 32, and is responsible for implementing and/or coordinating various functionalities described herein. A lowering mechanism 34 is coupled to a pipe assembly that is being generated and, as described in greater detail herein, lowers the pipe assembly through the opening in the OTEC platform 26 into the body of water. The lowering mechanism 34 may comprise any suitable structure and components capable of lowering an object. In one embodiment, the lowering mechanism 34 comprises a plurality of winches, each winch including a cable that can be selectively withdrawn or extended. The cables are connected to the pipe assembly and iteratively extended to slowly lower the pipe assembly through the opening and into the ocean as the pipe assembly is being manufactured.

A gantry 36 is coupled to an extrusion head 38 and is configured to move the extrusion head 38 based on pipe data that identifies a geometry of the pipe assembly. In one embodiment, the controller 28 accesses a data structure, such as a file, that contains the pipe data, and directs the gantry 36 to move the extrusion head 38 based on the pipe data. The pipe data may be in any desired format, such as, by way of non-limiting example, a G-code format. A stabilizer mechanism 40 is configured to maintain the pipe in a desired position during the extrusion of the material. The stabilizer mechanism 40 may comprise any suitable structure and components capable of stabilizing a pipe assembly and, in one embodiment, comprises a plurality of rollers that are respectively positioned about a circumference of the pipe assembly and that are configured to impose a force upon the pipe assembly from various respective directions such that the pipe assembly is maintained in a desired position. Generally, the embodiments generate the pipe assembly in a vertical orientation.

Figure 3:
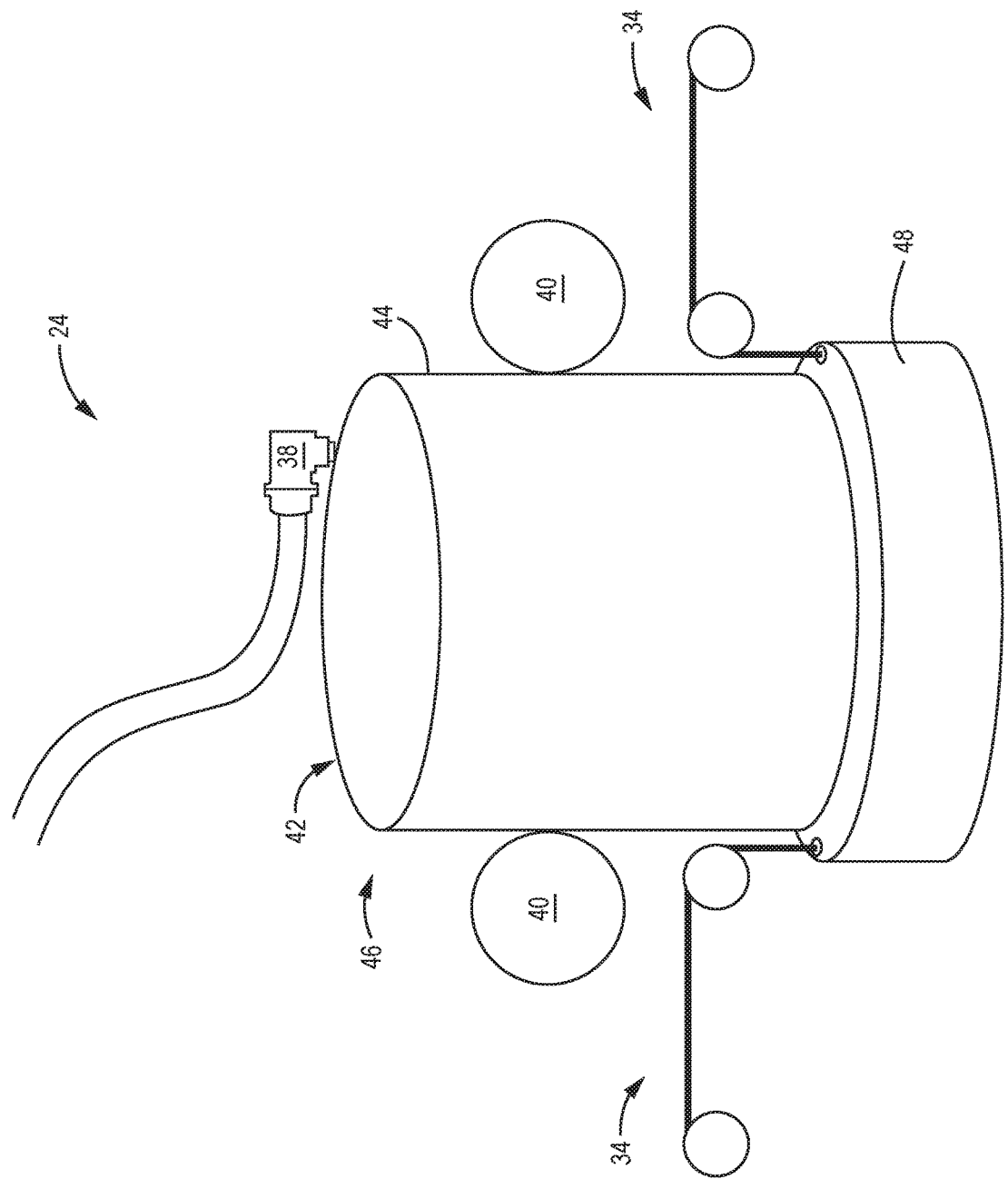
FIG. 3 is a simplified diagram illustrating certain components of a system for generating a pipe assembly according to one embodiment.

FIG. 3 is a simplified diagram illustrating certain components of the system 24 according to one embodiment. The extrusion head 38 receives a material, such as high-density polyethylene (HDPE), from a material source (not illustrated). Any other extrudable materials, such as, by way of non-limiting example, thermoplastics, poly-vinyl chloride, acrylonitrile butadiene styrene (ABS), or polymer of lactic acid (PLA) may also be utilized. The extrusion head 38 extrudes the material onto a top edge 42 of a pipe wall 44 of a pipe assembly 46. The pipe assembly 46 is maintained in a desired position by the stabilizer mechanism 40, which, in this embodiment, comprises a pair of opposing roller guides. In one embodiment, the pipe assembly 46 includes a ring of material 48, such as a clump weight, which may both provide a starting surface for the deposition of the material to form the pipe wall 44 and provide weight to help stabilize the pipe assembly 46 as it is generated. The lowering mechanism 34 is coupled to the ring of material 48. The ring of material 48 may comprise any desired material, including, by way of non-limiting example, aluminum, stainless steel, or other non-corrosive metals, fiberglass, machined plastic, or the like.

In operation, the ring of material 48 is first positioned with respect to the extrusion head 38, and is coupled to the lowering mechanism 34. The controller 28 (FIG. 2) directs the gantry 36 to move the extrusion head 38 in a circular pattern in accordance with the pipe data to form an initial pipe wall segment on the ring of material 48. The controller 28 then iteratively controls the lowering mechanism 34 to lower the pipe assembly 46 a predetermined distance, and then controls the gantry 36 and/or the extrusion head 38 to form an additional pipe wall segment on the previously formed pipe wall segment to extend the length of the pipe assembly 46. This process is repeated until the pipe assembly 46 is a desired length. In one embodiment, after the pipe assembly 46 has been generated to a desired length, the controller 28 controls the gantry 36 and/or the extrusion head 38 to form a flange on a surface end of the pipe assembly 46. The flange may have a greater exterior diameter than the exterior diameter of the pipe assembly 46, and can be used to secure the pipe assembly 46 to another component in the OTEC system.

Figure 4:
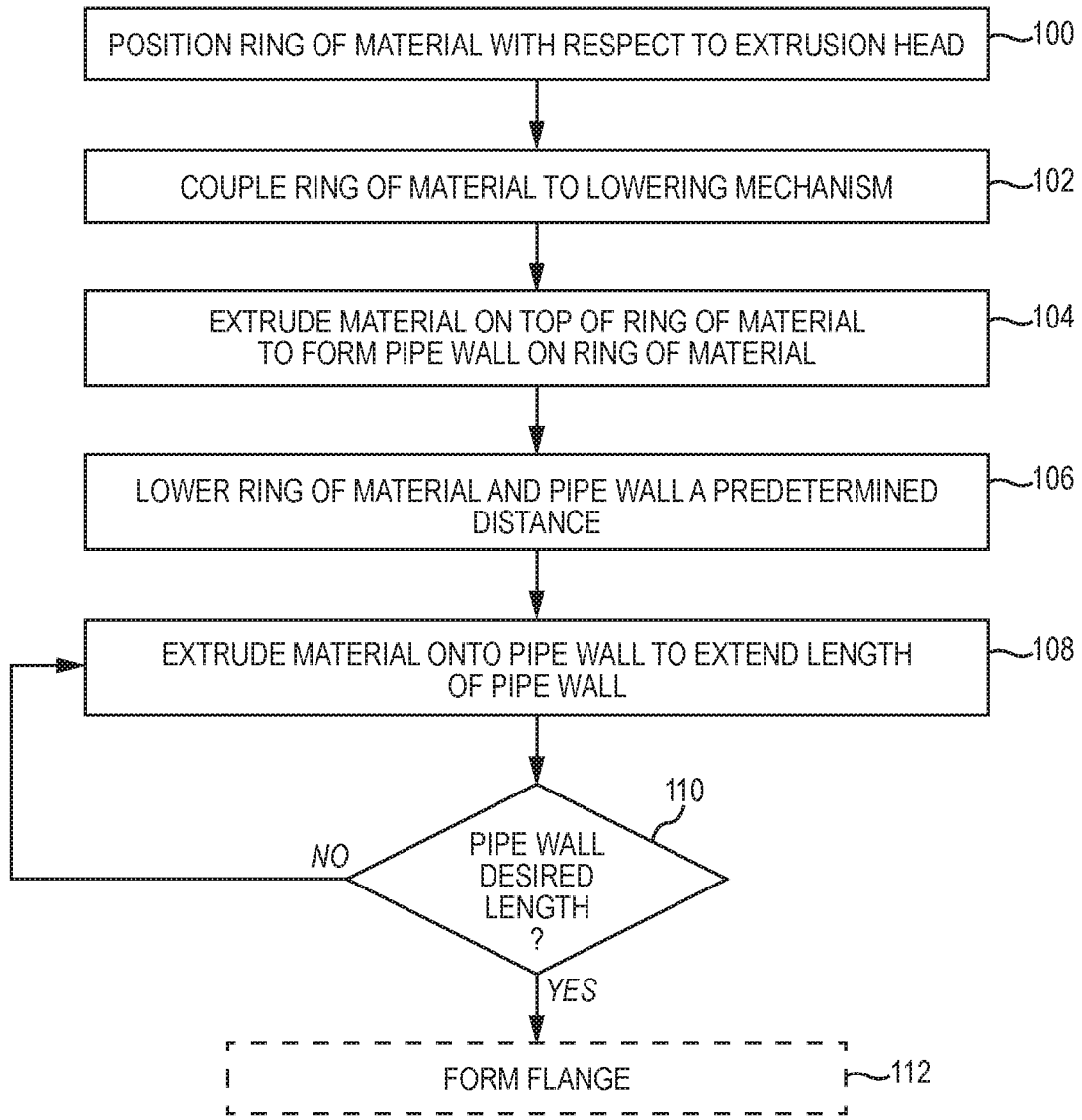
FIG. 4 is a flowchart of a method of generating the pipe assembly according to one embodiment.

FIG. 4 is a flowchart of a method of generating the pipe assembly 46 according to one embodiment. Initially, the ring of material 48, or some other similar support structure, is positioned with respect to the extrusion head 38 (block 100). The ring of material 48 is coupled to the lowering mechanism 34 in any desired manner (block 102). For example, the ring of material 48 may be manufactured with attachment mechanisms to which cables of the lowering mechanism 34 may be attached. The extrusion head 38 extrudes the material on the top of the ring of material 48 to form a pipe wall segment on the ring of material 48 (block 104). The pipe wall segment may comprise a single layer of material. The thickness of the layer of material (i.e., the height of each pipe wall segment) may depend on the particular material being extruded, but in some embodiments, the layer of material may be less than one inch thick. In some embodiments, the extrusion head 38 may be configured to heat the material. The lowering mechanism 34 lowers the pipe assembly 46 a predetermined distance (block 106). The predetermined distance may be the same as the height of each pipe wall segment that is extruded onto the pipe assembly 46. This process is iteratively repeated until the pipe assembly 46 is a desired length (block 110). The pipe wall of the pipe assembly 46 is unitary. After the pipe assembly 46 is the desired length, a flange may optionally be formed on an end of the pipe assembly 46 (block 112).

Figure 5:
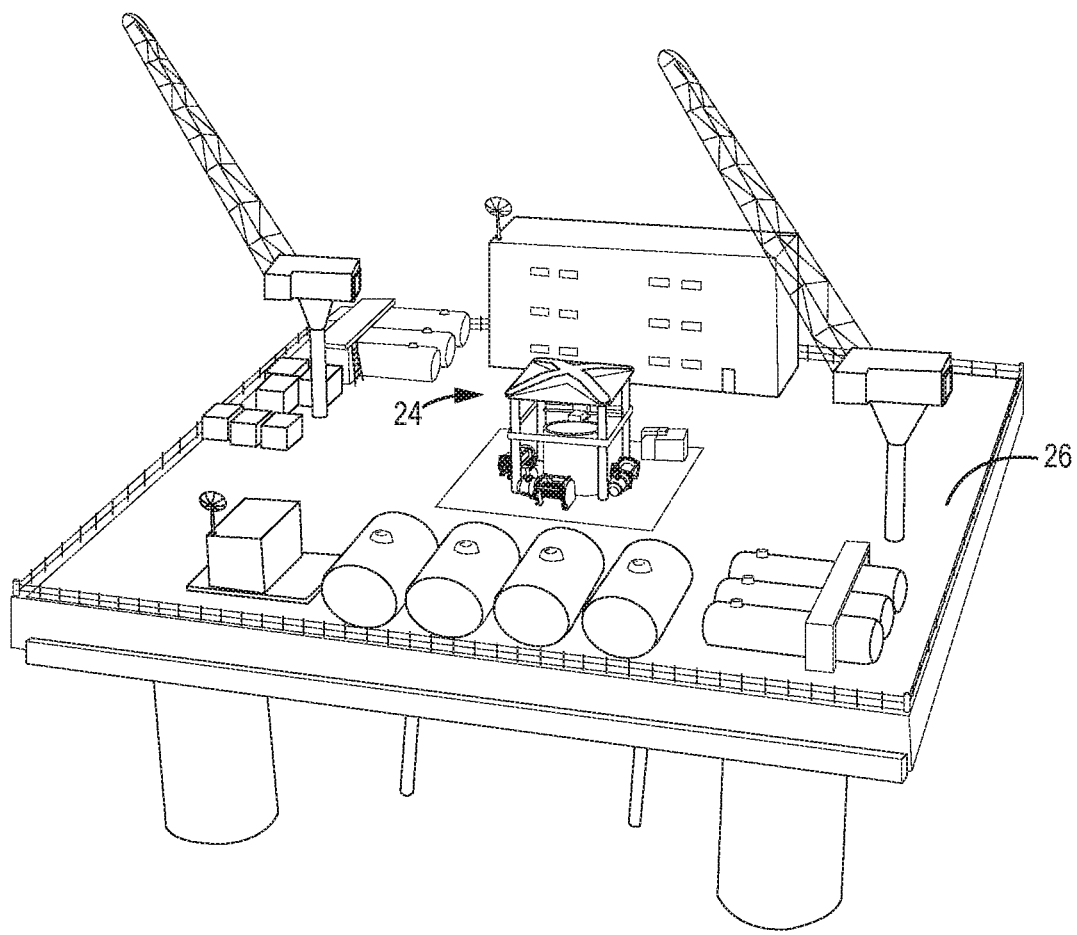
FIG. 5 is a perspective view of a system for generating a pipe assembly according to one embodiment.

FIG. 5 is a perspective view of the system 24 according to one embodiment.

Figure 6:
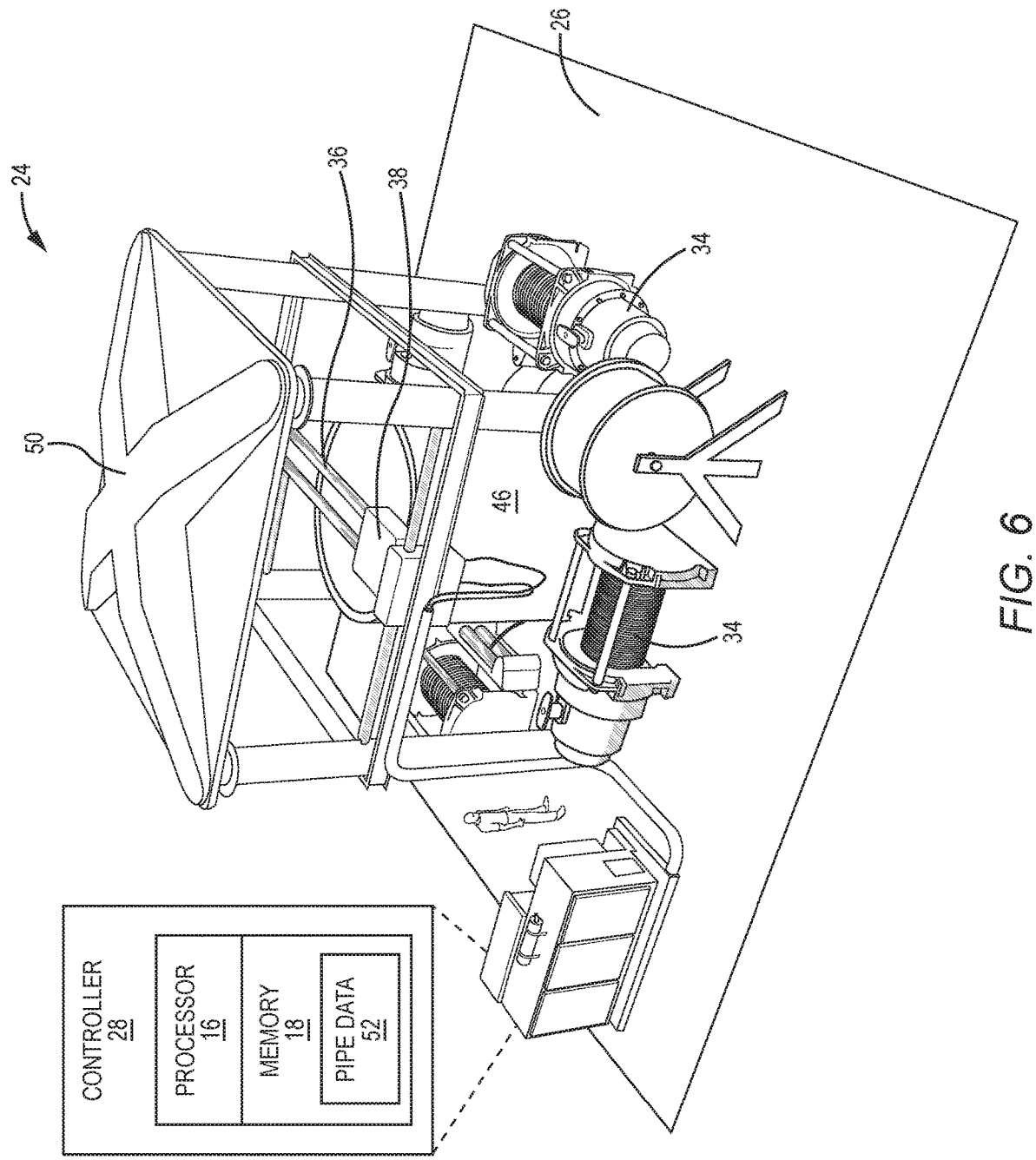
FIG. 6 is a perspective view of the system illustrated in FIG. 5 in greater detail.

FIG. 6 is a perspective view of the system 24 illustrated in FIG. 5 in greater detail. In this embodiment, the gantry 36 comprises a plurality of rods along which the extrusion head 38 can move to extrude the material on the pipe assembly 46. The gantry 36 is configured to move the extrusion head 38 to an identified location, such as about a top edge of the pipe assembly 46. The lowering mechanism 34, in this embodiment, comprises four winch/cable assemblies (two labelled) that are coupled to the platform 26 and that lower the pipe assembly 46 through an opening in the platform 26 into a body of water as the pipe assembly 46 is generated. In this embodiment, an enclosure 50 is open to the environment. However, in some embodiments, the enclosure 50 may be enclosed, and, optionally, the enclosed volume may be heated, to facilitate the softening and extrusion of the material.

In one embodiment, the controller 28 controls the gantry 36 to move the extrusion head 38 based on pipe data 52 that identifies a geometry of the pipe assembly 46. The stabilizer mechanism (not illustrated) maintains the pipe assembly 46 in a desired position. As illustrated, the pipe assembly 46 may be generated in a vertical orientation with respect to a horizon. The controller 28 selectively signals the lowering mechanism 34 to enter a halt mode or enter a lowering mode. In particular, in one embodiment, the controller 28 signals the lowering mechanism 34 to enter the halt mode to halt vertical movement of the pipe assembly 46. The controller 28 controls the gantry 36 to move the extrusion head 38 about an end of the pipe assembly 46 and signals the extrusion head 38 to extrude a layer of material onto the end of the pipe assembly 46. After the layer of material is extruded onto the top edge of the end of the pipe assembly 46, the controller 28 signals the lowering mechanism 34 to enter the lowering mode to lower the pipe assembly 46 a predetermined distance, such as a distance equivalent to a thickness of a layer of material extruded onto the top edge of the end of the pipe assembly 46.

Figure 7:
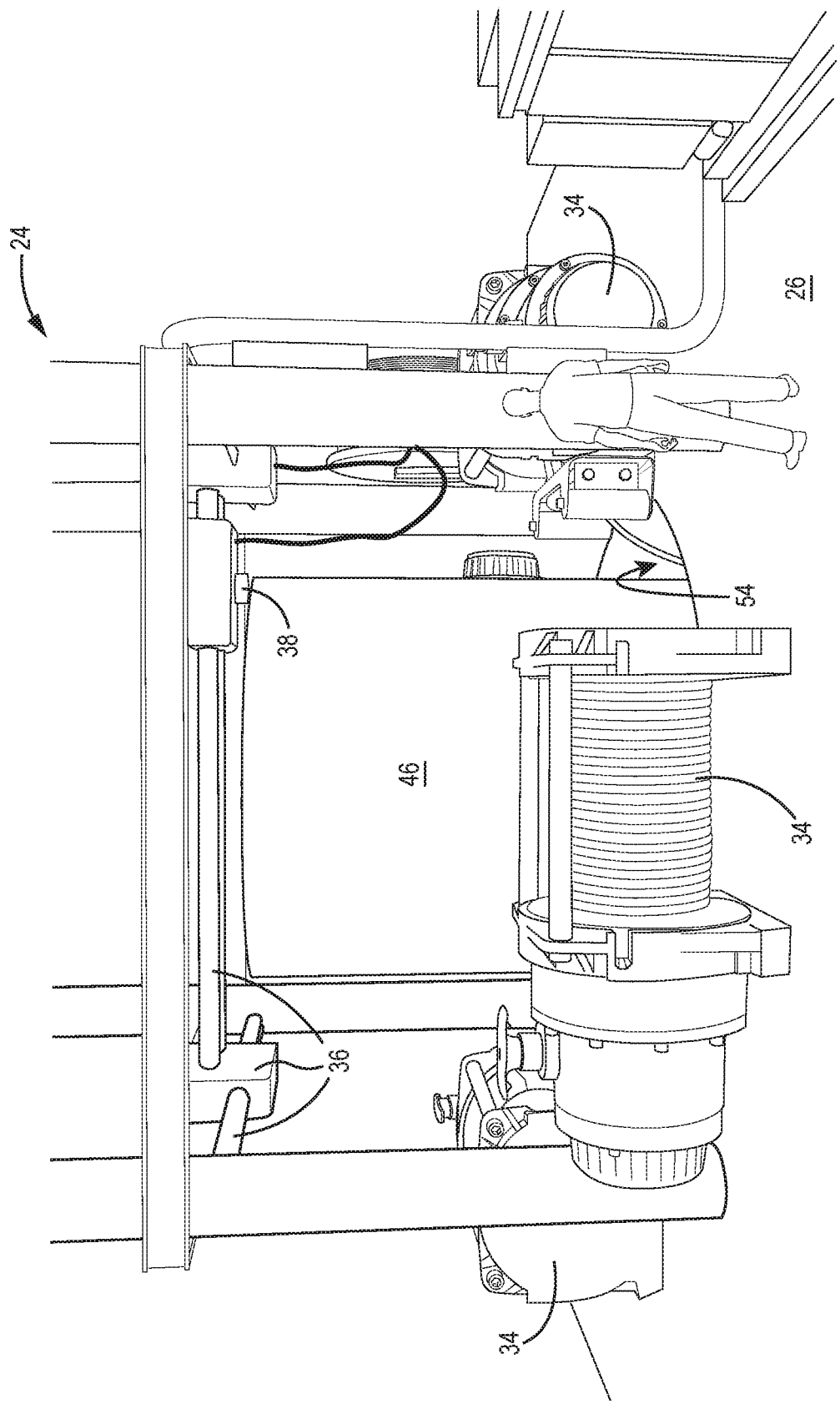
FIG. 7 is a perspective view of the system illustrated in FIG. 6 from a different perspective from that illustrated in FIG. 6.

FIG. 7 is a perspective view of the system 24 illustrated in FIG. 6 from a different perspective from that illustrated in FIG. 6. In addition to other features, FIG. 7 illustrates an opening 54 formed in the platform 26 through which the pipe assembly 46 is lowered as the pipe assembly 46 is being manufactured.

Figure 8:
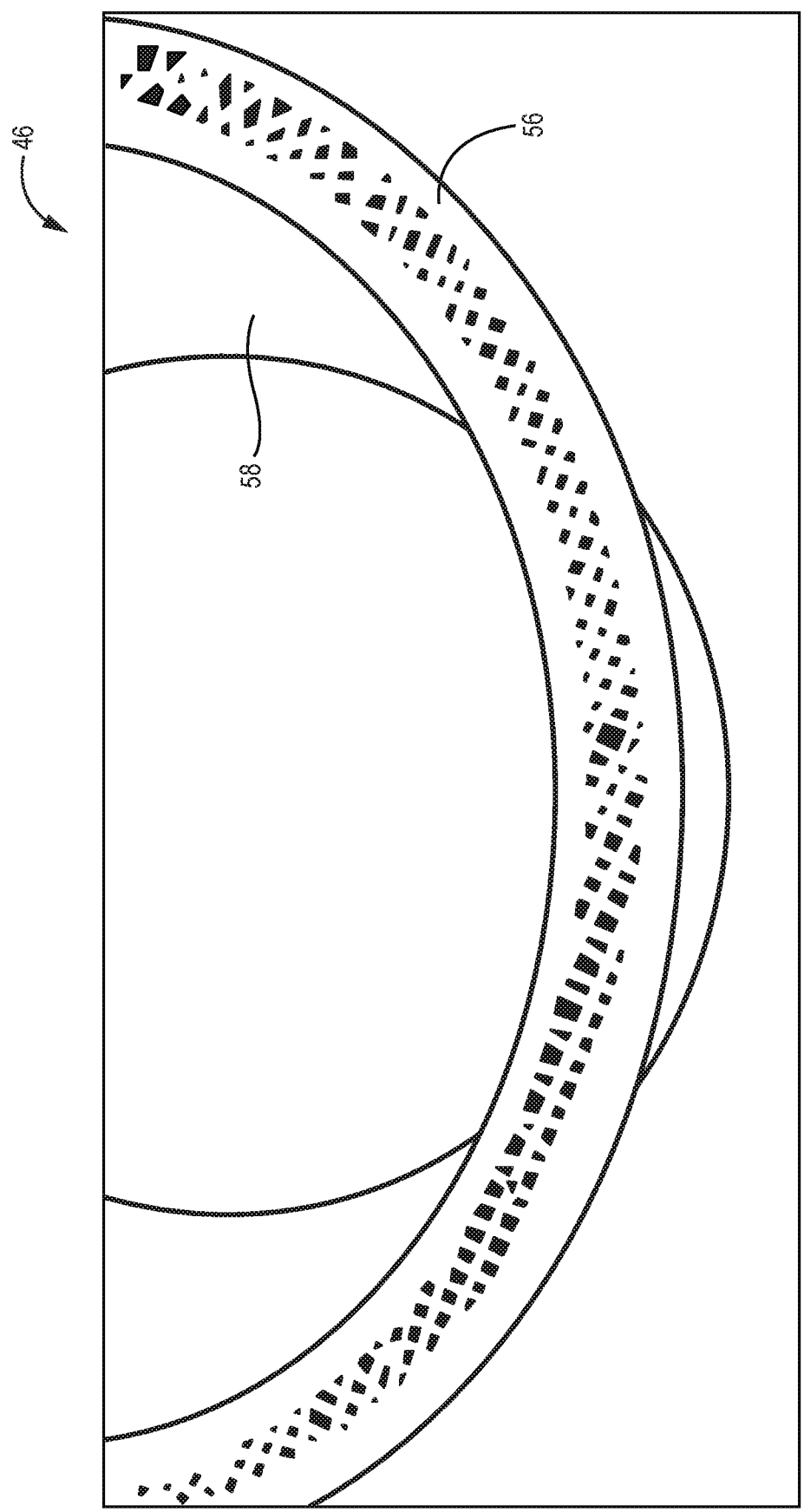
FIG. 8 is a rendering of a top edge of a pipe wall of the pipe assembly according to one embodiment.

FIG. 8 is a rendering of a top edge 56 of a pipe wall 58 of the pipe assembly 46 according to one embodiment. In this embodiment, the pipe wall 58 comprises a cellular structure. The cellular structure may be characterizable in terms of a void-to-material ratio. In some embodiments, the void-to-material ratio varies along a length of the pipe wall 58. For example, the void-to-material ratio may be greater at a bottom portion of the pipe assembly 46 than the void-to-material ratio at a top portion of the pipe assembly 46. In particular, ocean currents and other forces on the pipe assembly 46 may be lower in the deeper portions of the body of water than in the upper portions of the body of water. Thus, the lower portions of the pipe assembly 46 may require less structural integrity than the upper portions of the pipe assembly 46, and less material may be needed to generate the lower portions of the pipe assembly 46.

The void-to-material ratio of the pipe assembly 46 may continually vary along the longitudinal length of the pipe assembly 46, taking into consideration operational depths at which the respective portions of the pipe assembly 46 will be located. Alternatively, the void-to-material ratio may change in steps along the longitudinal length of the pipe assembly 46, again, taking into consideration operational depths at which the respective portions of the pipe assembly 46 will be located. The pipe wall 44 of the pipe assembly 46 may be any desired thickness. In some embodiments, the pipe wall 44 may be in a range of about 2 inches to about 2 feet thick. The thickness of the pipe wall 44 of the pipe assembly 46 may also vary along the longitudinal length of the pipe assembly 46. The particular void-to-material ratio at any point along the pipe assembly 46 may depend on a number of parameters, including, by way of non-limiting example, a desired axial stiffness, a desired elasticity, a desired hoop strength, and a desired buoyancy at each respective depth along the pipe assembly 46. In other embodiments, the pipe wall 44 may be a solid, non-cellular structure that varies in thickness based on the operational depths at which the respective portions of the pipe assembly 46 will be located.

Those skilled in the art will recognize improvements and modifications to the preferred embodiments of the disclosure. All such improvements and modifications are considered within the scope of the concepts disclosed herein and the claims that follow.

What is claimed is:

1. A method for generating a pipe assembly, comprising:
    positioning a ring of material with respect to an extrusion head;
    coupling the ring of material to a lowering mechanism;
    extruding material on top of the ring of material to form a pipe wall on the ring of material; and
    iteratively:
        1) lowering the ring of material and the pipe wall a predetermined distance; and
        2) extruding the material on the pipe wall to extend the pipe wall until the pipe wall is a desired length, the pipe wall generated as a cellular structure characterizable in terms of a void-to-material ratio that differs along a longitudinal length of the pipe wall, the void-to-material ratio at a bottom portion of the pipe wall greater than the void-to-material ratio at a top portion of the pipe wall such that a structural integrity of the top portion of the pipe wall is greater than a structural integrity of the bottom portion of the pipe wall.

2. The method of claim 1, further comprising lowering the ring of material and the pipe wall through an opening in a platform.

3. The method of claim 2, further comprising lowering the ring of material and the pipe wall through the opening in the platform into a body of water.

4. The method of claim 3, further comprising stabilizing the pipe wall while extruding the material on the pipe wall.

5. The method of claim 1, wherein the void-to-material ratio of the pipe wall decreases along the longitudinal length of the pipe wall.

6. The method of claim 1, wherein the lowering mechanism comprises a plurality of winches, each winch comprising a cable of a plurality of cables, and wherein coupling the ring of material to the lowering mechanism further comprises coupling the ring of material to the plurality of cables.

7. The method of claim 1, further comprising forming a flange on an end of the pipe wall, the flange having a greater exterior diameter than an exterior diameter of the pipe wall.

8. The method of claim 1, wherein the ring of material comprises a clump weight.

9. The method of claim 1, wherein the extruded material comprises high-density polyethylene (HDPE).

10. The method of claim 1, further comprising heating the material.

* * * * *